United States Patent [19]
Hurley

[11] Patent Number: 5,235,410
[45] Date of Patent: Aug. 10, 1993

[54] APPARATUS AND METHODS FOR NON-LINEAR PROCESSING OF DIGITAL SIGNALS

[75] Inventor: Terry R. Hurley, Newbury, England

[73] Assignee: Sony Broadcast & Communications Ltd., Basingstoke, England

[21] Appl. No.: 727,854

[22] Filed: Jul. 10, 1991

[30] Foreign Application Priority Data

Aug. 8, 1990 [GB] United Kingdom ............... 9017377

[51] Int. Cl.$^5$ ............................................. H04N 11/04
[52] U.S. Cl. ........................................ 358/13; 358/32
[58] Field of Search ................... 358/13, 13 C, 21 R, 358/32, 30

[56] References Cited

U.S. PATENT DOCUMENTS 4,322,739 3/1982 Drewery et al. .................. 358/13
4,520,386 5/1985 Asaida ................................ 358/13

Primary Examiner—Alvin E. Oberley
Assistant Examiner—Minsun Oh
Attorney, Agent, or Firm—William S. Frommer; Alvin Sinderbrand

[57] ABSTRACT

A digital signal is non-linearly processed without generation of alias components by modelling the required non-linear operation by the best available quadratic function. A transformation circuit for implementing the quadratic function $ax^2+bx$ may be used. As a result, only the second harmonic of each original frequency component of the digital signal is generated. Space for accommodating the original frequency components and the second harmonics can be made either by sampling frequency up-conversion in an interpolation up-converting circuit which doubles the sampling frequency, or by bandlimiting the original digital signal to a quarter of the original sampling frequency. In either case, the second harmonics occur below the Nyquist limit and no alias components are generated. A video signal color corrector makes use of both of the above techniques.

29 Claims, 4 Drawing Sheets $Z = aX^2 + bX$

APPARATUS AND METHODS FOR NON-LINEAR PROCESSING OF DIGITAL SIGNALS

BACKGROUND OF THE INVENTION

1. Field of the Invention

This invention relates to non-linear processing of digital signals, that is digital signal processing in which a non-linear operation is performed such as, for example, gamma correction in television or other display device applications.

2. Description of the Prior Art

In signal processing systems, a non-linear operation will cause harmonics of the input signal to be generated. For example, in television broadcasting applications, it is generally necessary to compensate for the non-linear characteristics of display devices such as cathode ray tubes (CRTs) by an appropriate inverse non-linear operation on the television signal so that the required display characteristics will be obtained. This is known as gamma correction, each type of display device having a particular gamma characteristic. The consequence of subjecting a signal to such a non-linear operation is that each frequency component of the signal will generate a sequence of harmonics. In digital systems, the generation of such harmonics can cause so-called alias components which can give rise to objectionable effects, such as various forms of interference. Since the alias components arise from the presence of harmonics above the Nyquist frequency limit, that is, half the value of the sampling frequency of the digital signal, one way of overcoming the problem is to design the system in such a way that any harmonics which are generated by the non-linear operation will always remain less than the Nyquist frequency limit; in practice this would mean substantially increasing the sampling frequency, and this results in a number of difficulties outlined in more detail below.

FIG. 1 of the accompanying drawings shows a typical non-linear characteristic of a gamma correction circuit for a television signal. A typical input/output characteristic of a television picture display device such as a CRT may be described by the following power law:

$$L = k E^\gamma$$

in which L is the light output of the CRT, k is a constant, E is the signal voltage applied to the CRT, and $\gamma$ (gamma) is a constant.

In any particular system, gamma will be a constant, and for CRTs, gamma will be between about 2.2 and 2.5.

The correction characteristic of FIG. 1 therefore needs to be applied in order to overcome the effect of the gamma characteristic, the signal voltage thereby being conditioned to be the inverse of the display device gamma characteristic. Due to the non-linear, and specifically logarithmic, nature of the inverse transformation between input and output amplitudes of the signal voltage, the frequency components of the input signal voltage generate harmonics, for example as shown in FIG. 2 of the accompanying drawings. In FIG. 2, a single (original) frequency component is shown as generating three harmonics at multiples of the original frequency, and in practice, all the frequency components of the signal will generate similar harmonics. Also, any non-linear operation on a signal will generate harmonics, the particular relative amplitudes of the harmonics depending on the specific nature of the non-linear operation.

In digital systems, as shown in FIG. 3 of the accompanying drawings, the harmonics which are generated by a non-linear operation can cause the above-mentioned undesirable alias components. In FIG. 3, an original frequency component of a digital signal sampled at a sampling frequency fs and subjected to a non-linear operation generates a second harmonic above the Nyquist limit fs/2. If the original frequency component has a frequency fo, the alias component fa will be disposed symmetrically about the Nyquist limit fs/2 with reference to the second harmonic, which will be at a frequency 2fo. Thus:

$$fs/2 - fa = 2fo - fs/2$$

and so:

$$fa = fs - 2fo.$$

Such alias components can cause objectionable effects, for example, picture distortion in television applications.

One method of overcoming the problem of aliasing in non-linear digital processing would be to increase the sampling frequency such that any harmonics which are generated as a result of the non-linear operation always remain below the Nyquist frequency limit. FIG. 4 of the accompanying drawings illustrates such a situation in which the sampling frequency is substantially increased to fs' such that all significant harmonics of the original frequency component of the digital signal are less than the Nyquist frequency limit fs'/2. The increased sampling frequency could be achieved by super-sampling or up-conversion, that is, by interpolation. However, this apparent solution is unlikely to be practical in most circumstances, for the following reasons. Firstly, in a particular system the sampling frequency may need to be fixed and so up-conversion, particularly to the extent required to deal with a number of harmonics, will not be possible. Secondly, the high processing rate caused by substantially increasing the sampling frequency may be excessive in practice. Thirdly, it may be necessary subsequently to down-convert the processed digital signal to the original sampling frequency, or to filter back the signal to the original bandwidth. Either of these processes would remove the harmonics generated outside the bandwidth by the non-linear operation and would also therefore tend to negate the effect of the non-linear operation.

SUMMARY OF THE INVENTION

It is an object of the present invention to provide apparatus for non-linear processing of a digital signal in which a non-linear transformation of the digital signal can be effected without generating undesired harmonics in the form of alias components.

It is another object of the present invention to provide apparatus for non-linear processing of a digital signal in which a non-linear transformation of the digital signal can be performed effectively without the need to increase the sampling frequency of the digital signal sufficiently to ensure that any harmonics generated as a result of the transformation always remain below the Nyquist frequency limit.

It is a further object of the present invention to provide color correction apparatus for a digital color video signal in which non-linear transformation, such as gamma correction, of the color component signals can be performed in a simple and effective manner.

According to one aspect of the present invention there is provided apparatus for non-linear processing of a digital signal having a first sampling frequency, the apparatus comprising:

means for increasing the sampling frequency of the digital signal to provide an up-converted digital signal with a second sampling frequency greater than the first sampling frequency, such that the second harmonic of the highest frequency component of the digital signal is below one half of the second sampling frequency; and non-linear transforming means for processing the up-converted digital signal with a quadratic function which approximates the required non-linear processing characteristic.

According to another aspect of the present invention there is provided apparatus for non-linear processing of a digital signal having a sampling frequency, the apparatus comprising:

means for bandlimiting the digital signal to provide a bandwidth-limited digital signal having a bandwidth less than that of the original digital signal, such that the second harmonic of the highest frequency component of the bandwidth-limited digital signal is below one half of the sampling frequency; and non-linear transforming means for processing the bandwidth-limited digital signal with a quadratic function which approximates the required non-linear processing characteristic.

The present invention also provides color correction apparatus for a digital color video signal in the form of a luminance signal at a first sampling frequency and first and second color difference component signals at a second sampling frequency which is one half of the first sampling frequency, the apparatus comprising;

means for bandlimiting the luminance signal to a bandwidth of one quarter of the first sampling frequency;

means for doubling the sampling frequency of the first and second color difference component signals to provide first and second up-converted color difference component signals at the first sampling frequency;

means for converting the bandlimited luminance signal and the first and second up-converted color difference component signals into first, second and third color component signals; and non-linear transforming means for processing the first, second and third color component signals with respective quadratic functions each approximating to a required color correction characteristic, thereby to provide first, second and third color corrected component signals.

As a result of modelling the required non-linear operation by a quadratic function, only the second harmonic of each original frequency component is generated. Space for accommodating the original frequency component and the second harmonic can preferably be created either by sampling frequency up-conversion by a factor of two, or by bandlimiting the original digital signal to a quarter of the original sampling frequency.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
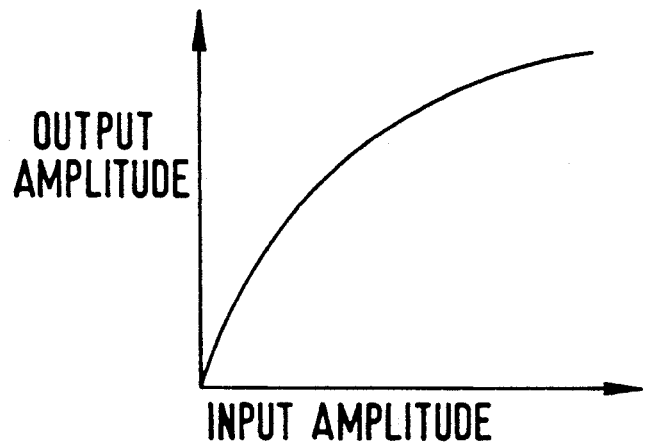
FIG. 1 is a graph showing a non-linear characteristic of a gamma correction circuit for a television signal.
Figure 2:
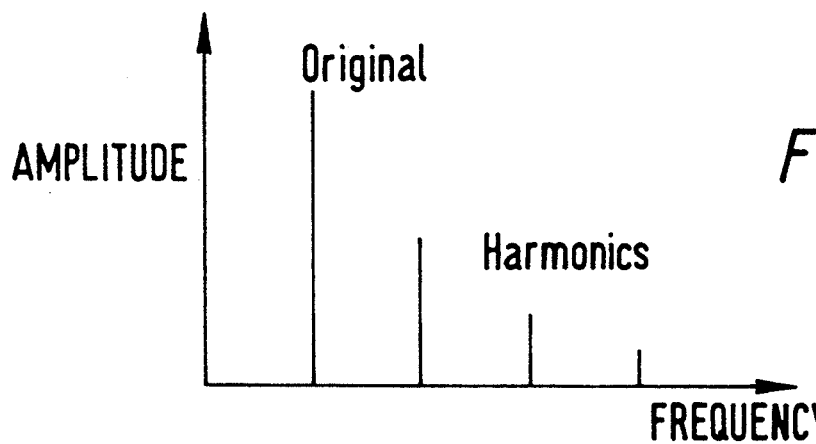
FIG. 2 is a graph showing harmonic generation by a non-linear operation acting on an original frequency component of a signal.
Figure 3:
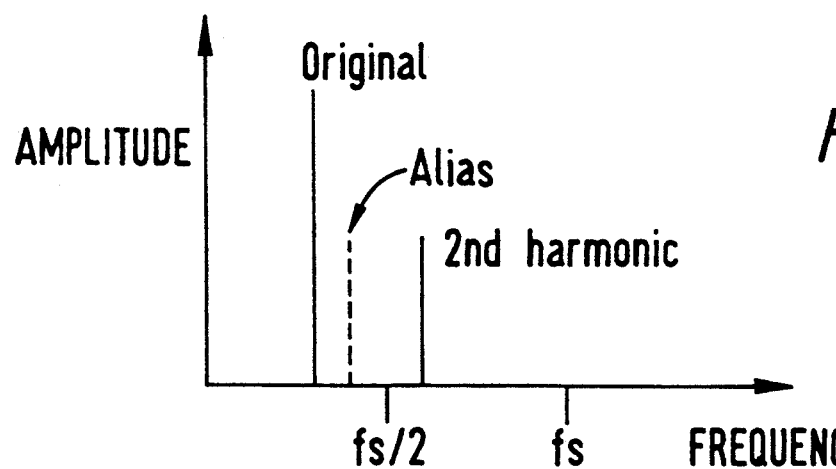
FIG. 3 is a graph showing generation of an alias component caused by the second harmonic arising from a non-linear operation on a digital signal being above the Nyquist frequency limit.
Figure 4:
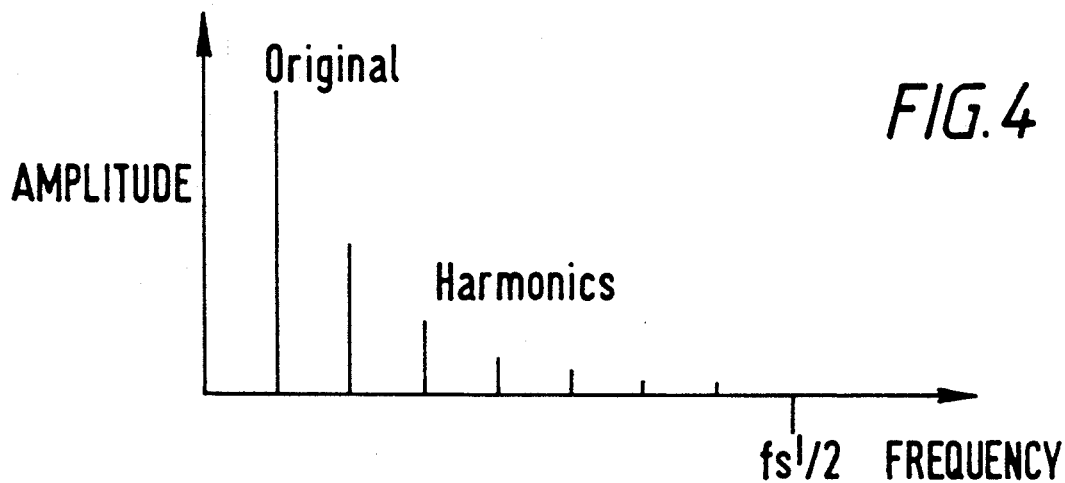
FIG. 4 is a graph showing harmonic generation from a non-linear operation with a substantially increased sampling frequency.
Figure 5:
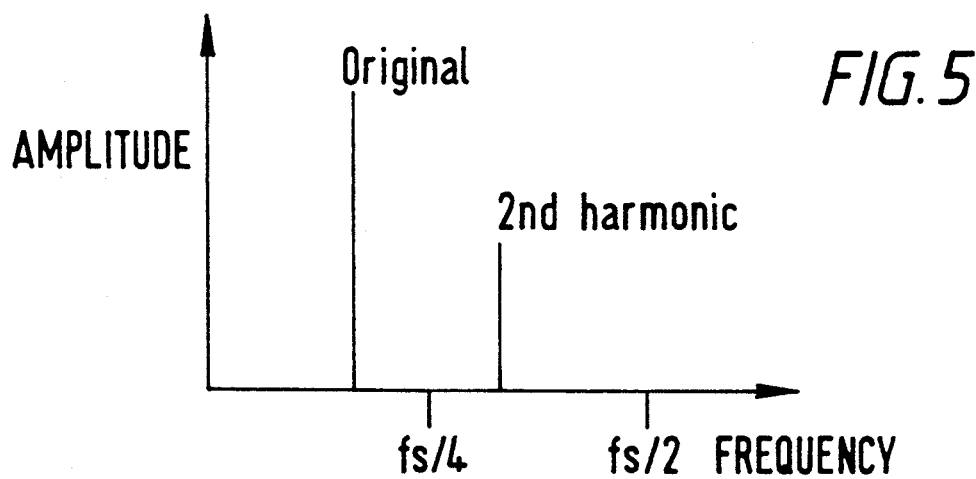
FIG. 5 is a graph showing a technique embodying the present invention using a quadratic approximation of a desired non-linear operation, and accommodation of the second harmonic of an original frequency component below the Nyquist frequency limit.

Referring to FIG. 5, a technique of digital non-linear processing embodying the invention will now be described. The technique is based on an approximation of the required non-linear operation by a quadratic function. The use of a quadratic function will restrict harmonic generation to the second harmonic only, as shown in FIG.5. For this purpose, it is necessary to model the non-linear operation as closely as possible by a quadratic function. The resulting digital signal, having been acted upon by the selected quadratic function, consists of the original input signal and its second harmonics, and this can be accommodated in twice the original bandwidth. As shown in FIG. 5, an original component of a signal with a frequency less than fs/4 (where fs is the sampling frequency) generates a second harmonic at a frequency less than fs/2, namely the Nyquist frequency limit. The extra space for the second harmonics of the original input signal can be created either by up-conversion of the sampling frequency by a factor of two, or by bandlimiting the original signal to half its original bandwidth, that is to fs/4. In the case of up-conversion of the sampling frequency, the up-conversion process should include filtering of the up-converted signal to remove frequency components between fs/2 and fs, the original sampling frequency being fs.

Figure 6:
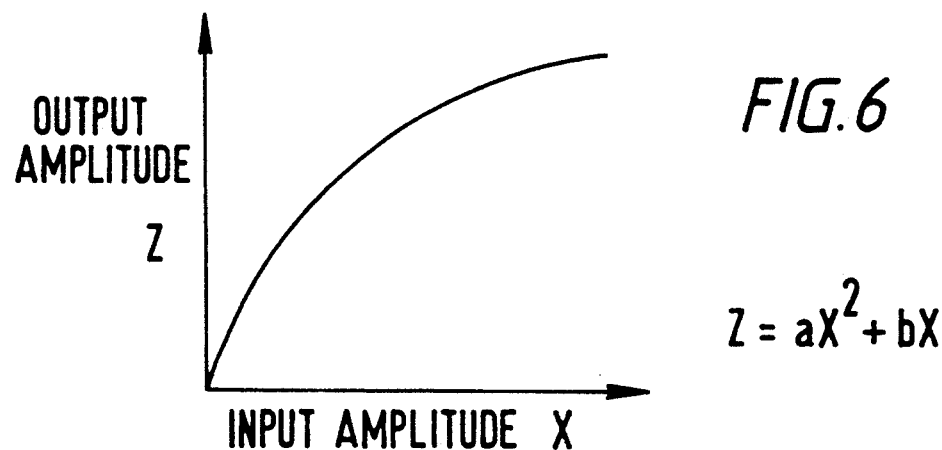
FIG. 6 is a graph showing modelling of the desired non-linear operation by a quadratic approximation.

FIG. 6 shows the modelling of the non-linear process by a quadratic curve, $Z = ax^2 + bx$.

Figure 7:
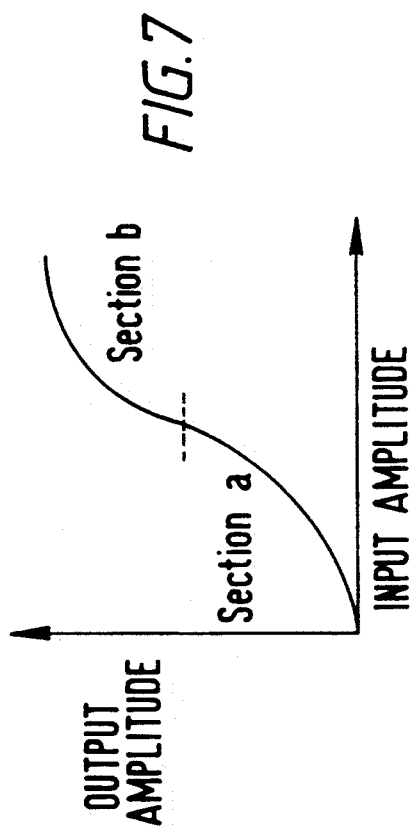
FIG. 7 is a graph showing modelling of a further non-linear operation by quadratic section approximation.

In certain cases, it will not be possible to arrive at a reasonable approximation of the non-linear process by a single quadratic function, and in such circumstances, a piecemeal approximation may be taken using quadratic sections. FIG. 7 shows two quadratic sections a and b used together to provide an S-law non-linear operation. When this approach is used, care needs to be taken to limit higher order non-linearity caused by the joins between the sections, and this would be minimized by limiting the amplitude of the input signal.

Figure 8:
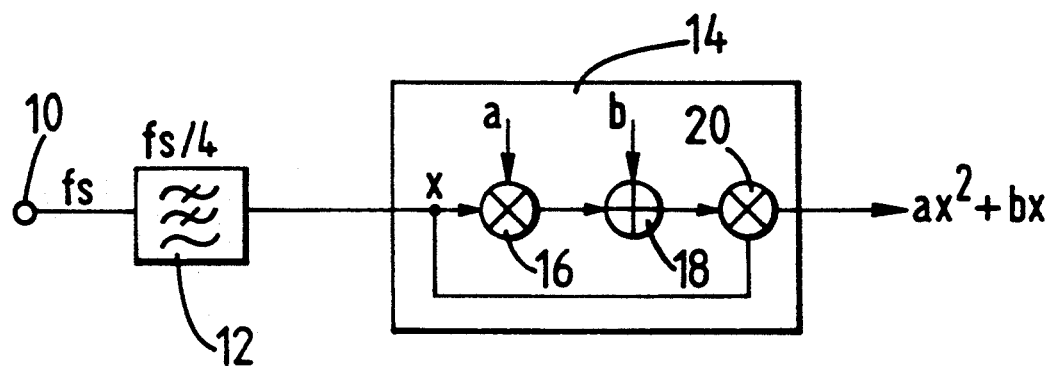
FIG. 8 is a block diagram of a circuit for digital non-linear transformation according to one embodiment of the invention.

FIG. 8 shows one embodiment of a circuit for digital non-linear transformation. A digital signal to be processed is applied via an input terminal 10 to a bandlimiting low-pass filter 12. The sampling frequency of the digital signal is fs, and the bandpass characteristic of the filter 12 is set to be fs/4. The bandlimited digital signal is then supplied to a non-linear quadratic transformation circuit 14. As explained above with reference to FIGS. 5 to 7, the (or each) quadratic function is chosen to model as precisely as possible the required non-linear transformation. If this is represented as in FIG. 6 by $ax^2+bx$, x being the input, the transformation circuit 14 may comprise, as shown, a first multiplier 16, an adder 18 and a second multiplier 20. With the input signal (x) applied to inputs of the first and second multipliers 16, 20 as shown, a factor a being applied to an input of the multiplier 16 and a factor b being applied to an input of the adder 18, the output of the transformation circuit 14 will be $ax^2+bx$, with second harmonics of the input signal being kept below the Nyquist frequency limit fs/2, as shown in FIG. 5, by virtue of the bandlimiting function of the filter 12. Thus no aliasing components will be generated.

Figure 9:
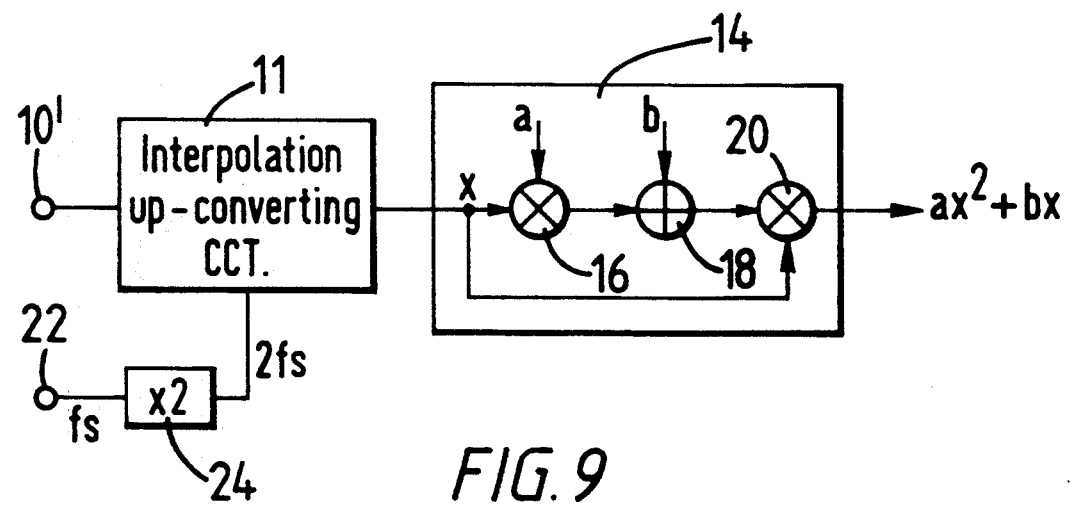
FIG. 9 is a block diagram of a circuit for digital non-linear transformation according to another embodiment of the invention.

FIG. 9 shows another embodiment of a circuit for digital non-linear transformation. The digital signal to be processed is applied via an input terminal 10' to an interpolation up-converting circuit 11. A clock signal at the frequency fs of the sampling frequency of the digital signal is applied via a clock terminal 22 and a frequency doubling circuit 24 to the up-converting circuit 11 which is operable to provide an up-converted signal at the doubled sampling frequency of 2fs. The up-converting circuit 11 interpolates between adjacent digital values to provide interpolated values, and therefore the digital signal has twice as many sampled values at the output of the up-converting circuit 11 as at the input thereof. The up-converting circuit 11 also filters out frequency components between fs/2 and fs. The up-converted signal from the up-converting circuit 11 is then supplied to the non-linear quadratic transformation circuit 14 which can be constituted by the first and second multipliers 16,20 and the adder 18 as in the circuit of FIG. 8. In similar manner, the output of the transformation circuit 14 will be $ax^2+bx$, with second harmonics of the input signal being kept below the Nyquist frequency limit (in this case fs, since the sampling frequency has been up-converted to 2fs). Thus again no aliasing components will be generated. The filtering operation of the up-converting circuit 11 ensures that the generated second harmonics will not have an adverse interaction with any frequency components originally present in the frequency range fs/2 to fs.

Figure 10:
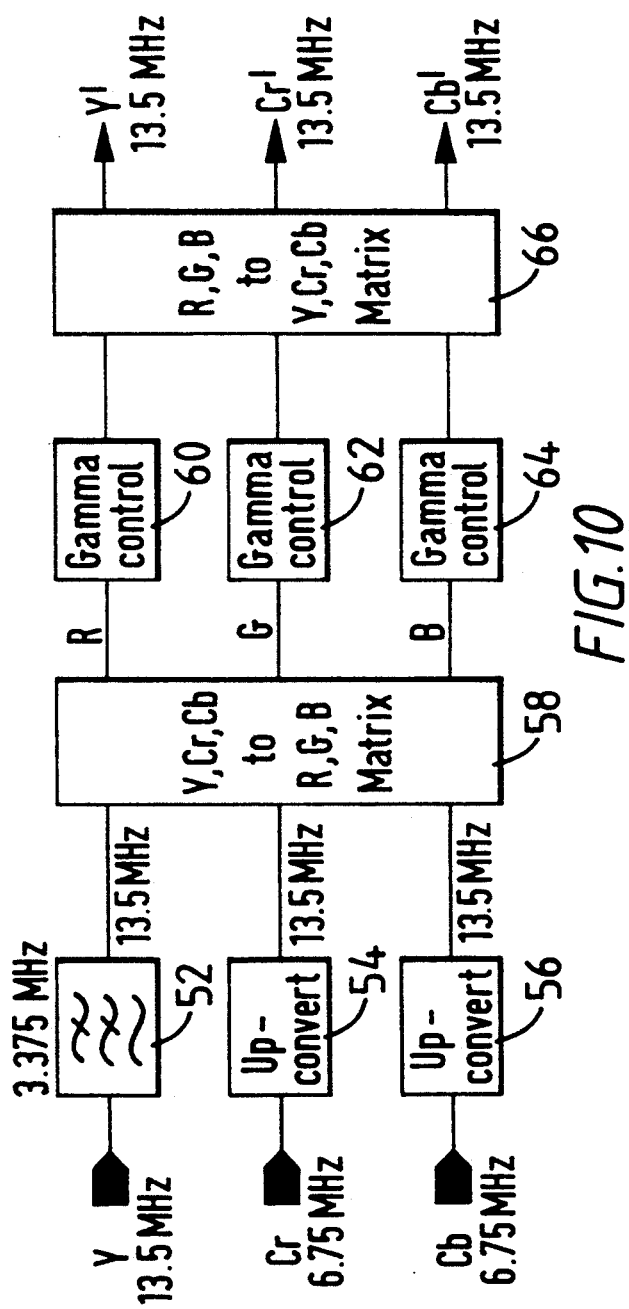
FIG. 10 is a block diagram of a color correction circuit for television or other video applications, gamma correction being provided according to a further embodiment of the invention.

A particularly advantageous application of the present invention arises in television/video signal processing, as shown in the circuit of FIG. 10, which represents a color correction circuit which may be used, for example, in television broadcast apparatus. The circuit can, for example, be used to process component digital video signals, such as those in accordance with CCIR Recommendation 601, these being in the form of a luminance signal Y sampled at 13.5 MHz and color (difference) components Cr and Cb each sampled at 6.75 MHz, or in the form of Y, Cr and Cb components decoded from a composite signal sampled at four times subcarrier frequency. When it is necessary to apply gamma correction to such signals, the above-described difficulties arise in that gamma correction is a non-linear, specifically logarithmic, process and thus multiple harmonics and alias components would arise from a standard non-linear transformation. Instead, as shown in FIG. 10, the luminance signal Y is supplied to a bandlimiting low-pass filter 52 (similar to that in the embodiment of FIG. 8) which restricts the bandwidth of the luminance signal Y by half to 3.375 MHz while maintaining the sampling frequency at 13.5 MHz.

The color components Cr and Cb are supplied to respective up-converting circuits 54,56 (similar to that in the embodiment of FIG. 9) in which, by interpolation, the number of samples per unit time is doubled and the sampling frequency increased from 6.75 MHz to 13.5 MHz, although the maximum bandwidth is limited to 3.375 MHz. The bandlimited luminance signal and the up-converted color components are then supplied to a matrix circuit 58 in which the signals are subjected to matrix manipulation in conventional manner to provide three component signals R,G,B. Each of these component signals R,G,B is supplied to a respective gamma control circuit 60,62,64, each of which is arranged to provide gamma adjustment by virtue of a suitable quadratic function. Each of the gamma control circuits 60,62,64 can be similar to the transformation circuits described with reference to FIGS. 8 and 9, in other words circuits suitable to effect a quadratic transformation of $ax^2+bx$. Alternatively, the circuits can be similar to those described in U.S. patent application Ser. No. 07/482,049 (Harradine) filed Feb. 20th, 1990, having a common assignee, and the contents of which are incorporated herein by reference. The circuits described in the earlier application can effect a quadratic transformation of $ax^2+bx+c$. The constant value c is used to provide a black level adjustment if required. The gamma control circuits 60,62,64 therefore provide gamma adjustment without generating higher harmonics and consequent alias components, the second harmonics being kept below the Nyquist frequency limit of 6.75 MHz for the three component signals R,G,B.

After gamma correction, the three component signals can be encoded in a matrix circuit 66 back into luminance Y and color component Cr,Cb form, whereupon the gamma-corrected video signal is present as a gamma-corrected luminance signal Y' and gamma-corrected color components Cr' and Cb'. If desired, the gamma-corrected color components Cr' and Cb' can then be down-converted to their original sampling frequencies of 6.75 MHz, although this will effectively remove the gamma correction applied to frequencies above 1.6875 MHz (6.75 MHz÷4) due to the act of filtering necessarily involved in the down-conversion. This filtering action will remove all frequencies above 3.375 MHz which would include the second harmonics of signals in the region between 1.6875 MHz and 3.375 MHz generated by the gamma correction process. However, despite the loss of the higher frequency gamma correction, it is found in practice that the technique is still effective for its purpose of compensating for the non-linear characteristics of display devices.

Accordingly, use of a technique embodying the present invention can provide a relatively simple and effective gamma correction circuit for television/video signals while overcoming the problem of alias component generation arising from digital non-linear transformation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for non-linear processing of digital signals in accordance with a predetermined non-linear processing characteristic to produce a processed digital signal, the apparatus comprising:
   sampling frequency increasing means for increasing the sampling frequency of an input digital signal having a first sampling frequency to provide an up-converted digital signal with a second sampling frequency greater than the first sampling frequency, such that the second harmonic of a highest frequency component of the up-converted digital signal is below substantially one half of the second sampling frequency; and
   non-linear transforming means for processing at least one of the up-converted digital signal and a digital signal based thereon in accordance with a quadratic function to produce the processed digital signal, the quadratic function being an approximation of said predetermined non-linear processing characteristic.

2. Apparatus according to claim 1, wherein said sampling frequency increasing means is operable to increase the sampling frequency of the input digital signal to the second sampling frequency which is substantially twice the first sampling frequency.

3. Apparatus according to claim 2, wherein the sampling frequency increasing means is operable to interpolate between successive samples of the input digital signal to provide said up-converted digital signal, and to limit the bandwidth of the un-converted digital signal to substantially half of the first sampling frequency.

4. Apparatus according to claim 1, wherein the sampling frequency increasing means is operable to interpolate between successive samples of the input digital signal to provide said up-converted digital signal, and to limit a bandwidth of the up-converted digital signal to substantially half of the first sampling frequency.

5. Apparatus according to claim 1, wherein the non-linear transforming means comprises:
   first multiplying means for multiplying said at least one of the up-converted digital signal and said digital signal based thereon by a first factor to produce a first multiplied signal;
   summing means for adding a second factor to the first multiplied signal to produce a summed signal; and
   second multiplying means for multiplying the summed signal by said at least one of the up-converted digital signal and said digital signal based thereon to produce said processed digital signal.

6. Apparatus according to claim 1, in combination with means for supplying first and second digital color difference signals to said sampling frequency increasing means as said input digital signal to provide first and second up-converted digital color difference signals, and matrix manipulation means for mixing the up-converted digital color difference signals with a digital luminance signal corresponding thereto to produce a plurality of color signals, and wherein the non-linear transforming means is operative to process said plurality of color signals in accordance with at least one quadratic function selected as an approximation of a non-linear video signal correction processing characteristic.

7. Apparatus according to claim 6, wherein the sampling frequency increasing means is operable to increase the sampling frequency of the first and second digital color difference signals to said second sampling frequency selected as a frequency substantially equal to a sampling frequency of said digital luminance signal.

8. Apparatus according to claim 6, wherein the means for supplying the first and second digital color difference signals is operative to decode the first and second digital color difference signals and the digital luminance signal from a composite signal sampled at four times subcarrier frequency.

9. Apparatus according to claim 1, wherein said non-linear transforming means is operable to process one of the up-converted digital signal and a digital signal based thereon in accordance with the quadratic function selected as an approximation of a non-linear video signal correction processing characteristic.

10. Apparatus according to claim 9, in combination with means for supplying at least one color difference signal as said input digital signal to said sampling frequency increasing means.

11. Apparatus according to claim 9, wherein said non-linear transforming means implements said quadratic function selected as an approximation of a non-linear gamma correction processing characteristic.

12. Apparatus for non-linear processing of digital signals in accordance with a predetermined non-linear processing characteristic to produce a processed digital signal, the apparatus comprising:
   bandwidth limiting means for bandlimiting an input digital signal having a predetermined sampling frequency and a predetermined bandwidth to provide a bandwidth-limited digital signal having a bandwidth less than said predetermined bandwidth, such that the second harmonic of a highest frequency component of the bandwidth-limited digital signal is below substantially one half of the predetermined sampling frequency; and
   non-linear transforming means for processing at least one of the bandwidth-limited digital signal and a digital signal based thereon in accordance with a quadratic function to produce the processed digital signal, the quadratic function being an approximation of said predetermined non-linear processing characteristic.

13. Apparatus according to claim 12, wherein said bandwidth limiting means is operable to limit the bandwidth of the bandwidth-limited digital signal to one half of that of the input digital signal.

14. Apparatus according to claim 13, wherein said bandwidth limiting means is operable to limit the bandwidth of the bandwidth-limited digital signal to one quarter of the predetermined sampling frequency.

15. Apparatus according to claim 12, wherein said bandwidth limiting means is operable to limit the bandwidth of the bandwidth-limited digital signal to one quarter of the predetermined sampling frequency.

16. Apparatus according to claim 12, wherein the non-linear transforming means comprises:
   first multiplying means for multiplying said at least one of the bandwidth-limited digital signal and said digital signal based thereon by a first factor to produce a first multiplied signal;

summing means for adding a second factor to the first multiplied signal to produce a summed signal; and second multiplying means for multiplying the summed signal by said at least one of the bandwidth-limited digital signal and said digital signal based thereon to produce said processed digital signal.

17. Apparatus according to claim 12, in combination with means for supplying a digital luminance signal to said bandwidth limiting means to provide a bandwidth limited digital luminance signal, and wherein the non-linear transforming means is operative to process at least one of the bandwidth-limited digital luminance signal and a digital signal based thereon in accordance with a quadratic function selected as an approximation of a non-linear video signal correction process.

18. Apparatus according to claim 12, wherein said non-linear transforming means is operable to process one of the bandwidth-limited digital signal and a digital signal based thereon in accordance with the quadratic function selected as an approximation of a non-linear video signal correction processing characteristic.

19. Apparatus according to claim 18, in combination with means for supplying a luminance signal as said input digital signal to said bandwidth limiting means.

20. Apparatus according to claim 18, wherein said non-linear transforming means is operable to implement said quadratic function selected as an approximation of a non-linear gamma correction processing characteristic.

21. Color correction apparatus for a digital color video signal in a form of a digital luminance signal having a first sampling frequency and first and second digital color difference component signals having a second sampling frequency which is substantially one half the first sampling frequency, the apparatus comprising:

means for bandlimiting the digital luminance signal to a bandwidth substantially one quarter of the first sampling frequency to provide a bandlimited luminance signal;

means for substantially doubling the sampling frequency of the first and second digital color difference component signals to provide first and second up-converted digital color difference component signals having the first sampling frequency;

means for converting the bandlimited luminance signal and the first and second up-converted digital color difference component signals into first, second and third digital color component signals; and non-linear transforming means for processing the first, second and third digital color component signals with respective quadratic functions each approximating a predetermined color correction characteristic, thereby to provide first, second and third color corrected component signals.

22. Apparatus according to claim 21, including means for encoding the first, second and third color corrected component signals into a corrected luminance signal and first and second corrected color difference component signals.

23. Apparatus according to claim 22, wherein the non-linear transforming means is operable to implement said respective quadratic functions selected as an approximation of a non-linear gamma correction characteristic.

24. Apparatus according to claim 21, wherein the non-linear transforming means is operable to implement said respective quadratic functions selected as an approximation of a non-linear gamma correction characteristic.

25. Apparatus according to claim 21, in combination with means for supplying the digital luminance signal having the first sampling frequency of substantially 13.5 MHz and for supplying the first and second digital color difference component signals having a second sampling frequency of substantially 6.75 MHz.

26. Apparatus according to claim 21, in combination with means for decoding the digital luminance signal and the first and second digital color difference component signals from a composite signal having a sampling frequency which is substantially equal to four times subcarrier frequency.

27. A method for non-linear processing of digital signals in accordance with a predetermined non-linear processing characteristic to produce a processed digital signal, comprising the steps of:

increasing the sampling frequency of an input digital signal having a first sampling frequency to provide an up-converted digital signal with a second sampling frequency greater than the first sampling frequency, such that the second harmonic of a highest frequency component of the up-converted digital signal is below substantially one half of the second sampling frequency; and processing at least one of the up-converted digital signal and a digital signal based thereon in accordance with a quadratic function to produce the processed digital signal, the quadratic function being an approximation of said predetermined non-linear processing characteristic.

28. A method for non-linear processing of digital signals in accordance with a predetermined non-linear processing characteristic to produce a processed digital signal, comprising the steps of:

bandlimiting an input digital signal having a predetermined sampling frequency and a predetermined bandwidth to provide a bandwidth-limited digital signal having a bandwidth less than said predetermined bandwidth, such that the second harmonic of a highest frequency component of the bandwidth-limited digital signal is below substantially one half of the predetermined sampling frequency; and processing at least one of the bandwidth-limited digital signal and a digital signal based thereon in accordance with a quadratic function to produce the processed digital signal, the quadratic function being an approximation of said predetermined non-linear processing characteristic.

29. A method for color correcting a digital color video signal in a form of a digital luminance signal having a first sampling frequency and first and second digital color difference component signals having a second sampling frequency which is substantially one half the first sampling frequency, comprising the steps of:

bandlimiting the digital luminance signal to a bandwidth substantially one quarter of the first sampling frequency to provide a bandlimited luminance signal;

substantially doubling the sampling frequency of the first and second digital color difference component signals to provide first and second up-converted digital color difference component signals having the first sampling frequency;

converting the bandlimited luminance signal and the first and second up-converted digital color difference component signals into first, second and third digital color component signals; and processing the first, second and third digital color component signals with respective quadratic functions each approximating a predetermined color correction characteristic, thereby to provide first, second and third color corrected component signals.

* * * * *